United States Patent Office 3,033,231
Patented May 8, 1962

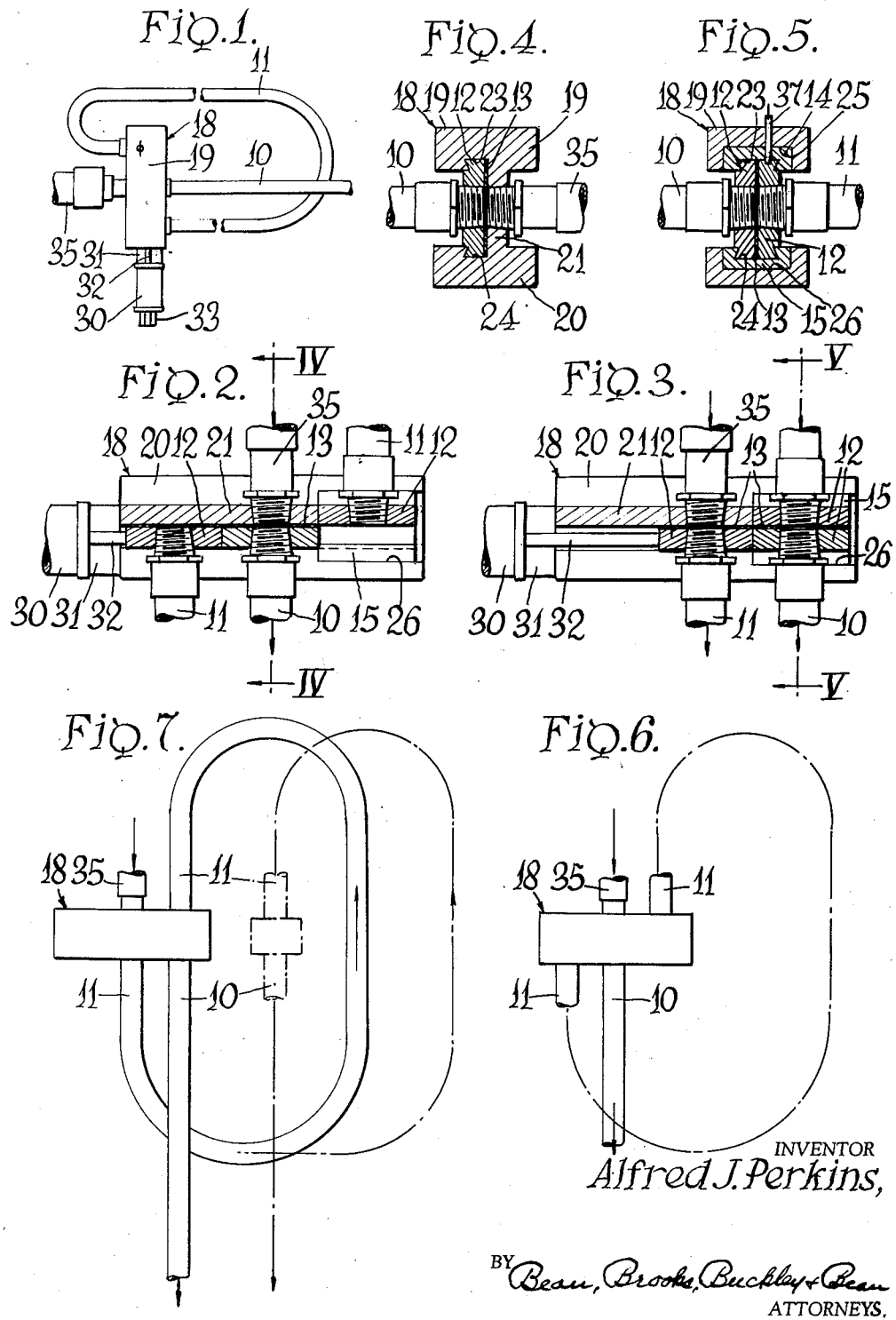

3,033,231
APPARATUS FOR INSERTING LENGTHS OF
TUBING FOR A LINE
Alfred J. Perkins, Medulla, Fla., assignor to Perkins Pipe
Linings, Inc., Grand Island, N.Y.
Filed May 3, 1960, Ser. No. 26,491
9 Claims. (Cl. 137—561)

This invention relates to quick detachable and attachable coupling apparatus for flexible tubing such as hose and more particularly to an apparatus for inserting a length of flexible tube or hose into a line of such tubing or hose while the latter is under pressure and without interrupting the flow of fluid therethrough.

My prior Patent 2,786,486 dated March 26, 1957, discloses and claims means for removing sections of tubings from a line of connected tubing sections while such line is in use and under pressure. The apparatus of my prior patent is particularly useful in machines for applying a concrete lining to the interior of a pipe by moving a pipe lining machine therethrough. In such machines the plastic material in the form of cement mortar is transmitted to the machine which is in the interior of the pipe from a mortar supply which is remotely located by pumping the mortar through a hose or flexible tubing consisting of a number of connected sections.

In this particular field of use, as the distance between the mortar supply and the pipe lining machine is reduced it is highly desirable to remove sections of the mortar supply hose since the pumping pressure required to deliver mortar at the pipe lining machine is directly proportional to the length of flexible tubing or hose through which the mortar must be transmitted.

The present invention is concerned with a different form of apparatus for and a method of inserting sections of hose or other flexible tubing in a line of connected tubing sections while the line is under pressure and while fluid or fluent material is being delivered therethrough. It is believed that the method and apparatus of the present invention is of more general adaptability than the tubing removing means of my prior patent since it appears that the desirability of inserting tubing or hose sections to increase the length of a line of tubing or hose lends itself to a broader field of usefulness.

The desirability of removing sections of hose is somewhat peculiar to above described mortar feeding operation and some excess length of hose is not materially disadvantageous in most instances where hose is employed. On the other hand, in any field of use, if a hose is too short to reach a given objective, it must be lengthened.

The principles of the present invention may be applied to inserting hose or tubing sections in a line which is conducting a fluid or liquid or fluent material of any kind whatever and under substantially any pressure conditions. The operation is conducted with substantially no leakage from the line, with no pressure drop, and with no appreciable interruption in the continuous flow of fluid through the line.

The apparatus of the present invention may be employed, merely as one example, for inserting lengths of hose while such hose is in use in fire fighting operations. Obviously, any delay necessitated by the need for a greater length of hose and the consequent necessity of inserting or adding hose sections during fire fighting operations is extremely serious. Accordingly, the ability to insert hose sections without delay and almost instantaneously and while full pressure fluid flow continuous to obtain in the line of hose is of vast importance.

The accompanying drawing illustrates one embodiment of apparatus for inserting lengths of flexible tubing or hose into a line of such tubing but it is to be understood that the apparatus shown and described is by way of example only and that such apparatus may assume various mechanical forms without departing from the underlying principles of the present invention. The spirit and scope of the invention are not limited otherwise than as defined in the appended claims.

In the drawings:

FIG. 1 is a top plan view of one form of apparatus for inserting lengths of flexible tubing into a line of such tubing;

FIG. 2 is a longitudinal cross sectional view of the apparatus of FIG. 1 on a larger scale and viewed as in top plan;

FIG. 3 is a view similar to FIG. 2 but with the parts in a different position illustrating a later phase of operation;

FIG. 4 is a cross sectional view on the line IV—IV of FIG. 2;

FIG. 5 is a cross sectional view on the line V—V of FIG. 3;

FIG. 6 is a somewhat schematic top plan view of the apparatus showing a first phase of operation preparatory to actual insertion; and FIG. 7 is a view similar to FIG. 6 showing later phases of the insertion operation.

Like characters of reference denote like parts throughout the several figures of the drawing. For illustrative purposes the actual coupling members of the flexible tubing lengths in the example set forth herein by way of example may be the same as in my prior patent identified above. Thus the several lengths of flexible tubing, such as those designated 10 and 11 in the drawing, each have a coupling plate 12 fixed to each end thereof. Two coupling plates 12, one having a gasket 13 fixed to its face, are adapted to be held in face to face conduit-connecting relationship by upper and lower clamping blocks 14 and 15.

A pair of tubing ends coupled in the above manner are illustrated in FIG. 5 and it will be noted that the upper and lower edges of the coupling plates 12 are grooved to cooperate with dovetail grooves in the clamping blocks 14 and 15 to hold the coupling plates in close surface contact.

As indicated, the foregoing coupling arrangement is set forth by way of example and the principles of the present invention are equally applicable to other laterally separable tubing couplings, as for instance the type illustrated and described in an application for patent being filed on this date by Albert G. Perkins and entitled "Hose and Cable Coupling," Serial No. 26,546.

Referring now to FIGS. 1, 2 and 4, the apparatus for inserting tubing lengths comprises mainly a body member designated generally by the numeral 18 and having upper and lower rectangular block formations 19 and 20. The upper and lower block formations are unified and held in rigid relative vertically spaced relationship by a vertical web formation 21 which extends between the block formations throughout about two thirds of the length of such formations, beginning at the left hand sides of the blocks as viewed in FIG. 2 or the bottom ends thereof as viewed in FIG. 1.

Alongside the web formation 21 the under surface of block formation 19 and the upper surface of block formation 20 are formed with undercut grooves 23 and 24 adapted to receive the complementarily grooved upper and lower edges of tubing coupling plates 12 so that the latter are guided for longitudinal sliding movement between the upper and lower block formations 19 and 20 in a direction at right angles to the axes of the tubing members bearing the coupling plates.

The remaining approximately one-third of the lengths of the block formations 19 and 20 which are not occupied by the web formation 21 are grooved in their facing lower and upper surfaces as at 25 and 26, respectively, in FIG. 5 to receive coupling plate clamping blocks 14 and 15 therein.

Referring particularly to FIG. 1, as in the case of my prior Patent No. 2,786,486, a hydraulic or air pressure cylinder 30 is pivotally mounted as at 33 on a lateral extension 31 of lower block 20 and the piston rod 32 thereof is directed to bear against a coupling plate 12 disposed in the grooves 23 and 24 at the side of the block formations 19 and 20 which is adjacent to the cylinder 30, all as shown in FIG. 2.

The general manner of use of the foregoing apparatus will now be described. It will be noted particularly by reference to FIG. 2 that a fluid conduit member 35 is connected to web formation 21 at approximately the midpoint of the body member 18 to emerge at the face of web formation 21 which is adjacent to the grooves 23 and 24. Coupling member 12 of conduit 10 is shown in FIG. 2 in fluid communication with conduit 35 and this is the normal condition, conduit or tubing 10 comprising a continuation of conduit member 35.

Conduit member 35 may comprise the outlet of a pump mechanism or a hydrant or may merely be a terminal portion of a fluid pressure conduit of any other kind. Flexible tubing 10 may comprise one of a series of connected tubing sections extending to any desired point and one object of the apparatus of the present invention is to lengthen such a series of sections by inserting an extra length of flexible tubing in the line, as for instance the length of tubing designated 11 in the drawing.

To accomplish this purpose one coupling 12 of the length of tubing 11 is placed in the grooves 23 and 24 of body member 18 at the left-hand side thereof, as viewed in FIG. 2, and the coupling member 12 at the opposite end of tubing length 11 is disposed in the grooves of a pair of coupling clamping blocks 14 and 15 which are disposed in the grooves 25 and 26 of body member 18 at the right-hand side thereof, as viewed in FIG. 2. A locating or retaining pin 37, see FIG. 5, may be provided for retaining coupling member 12 of tubing length 11 in proper position at one side of the grooves in the coupling clamping blocks 14 and 15.

The fluid pressure cylinder 30 is now activated to project the piston rod 32 thereof to the right, as viewed in FIG. 2 (upwardly as viewed in FIG. 1) to jointly push the two coupling plates 12 of the tubing members 10 and 11 in the grooves 23 and 24 of body member 18 from the positions of FIG. 2 to the positions illustrated in FIG. 3. This operation is substantially instantaneous and, as shown schematically in FIGS. 6 and 7, moves the coupling connections from the position of FIG. 6, wherein fluid flow is direct from conduit member 35 to tubing member 10, to the position shown in full lines in FIG. 7 wherein flow from conduit member 35 extends through tubing length 11 and thence to tubing length 10.

At this time the detent pin 37 may be released and the assembled coupling plates 12 and clamping blocks 14 and 15 which are shown at the right-hand side of FIG. 3 may be moved laterally out of the body member 18 as indicated in dot and dash lines in FIG. 7. At this time the inserting operation is complete and the flexible conduit which now includes the tubing length 11 may be drawn away from body member 18 or employed in any desired manner.

I claim:

1. Apparatus for coupling flexible tubing elements having end coupling members attachable by relative lateral movement, said apparatus comprising a body member having a fluid passage emerging at a face thereof, means for holding a tubing end coupling member of a flexible tubing element against said face in fluid communication with said fluid passage, means at one side of said body member for holding a second like end coupling member of another flexible tubing element at one side of said first end coupling member in lateral alignment therewith, means at the other side of said housing member for holding the other end coupling member of said other tubing element in lateral alignment with said body member face, and means for simultaneously shifting the first end coupling member and said second like end coupling member jointly laterally whereby the first end coupling member moves from said fluid passage and into coupling engagement with said other end coupling member of said other tubing element and said second like end coupling member moves into fluid communication with said fluid passage.

2. Apparatus for coupling flexible tubing elements having end coupling members attachable by relative lateral movement, said apparatus comprising a body member having a fluid passage emerging at a face thereof, means for holding a tubing coupling member of a flexible tubing element against said face in fluid communication with said fluid passage, means at one side of said body member for holding a second coupling member of another flexible tubing element at one side of said first coupling member in lateral alignment therewith, means at the other side of said housing member for holding a third coupling member at the other end of said other tubing element in alignment with said body member face, and means for simultaneously shifting the first and second coupling members jointly laterally whereby the first coupling member moves from said fluid passage and into coupling engagement with said third coupling member and said second coupling member moves into fluid communication with said fluid passage.

3. Apparatus for coupling flexible tubing elements having end coupling members attachable by relative lateral movement, said apparatus comprising a body member having a fluid passage emerging at a face thereof, means for holding a tubing coupling member of a flexible tubing element against said face in fluid communication with said fluid passage, means at one side of said body member for holding a second coupling member of another flexible tubing element at one side of said first coupling member in lateral alignment therewith, means at the other side of said housing member for holding a third coupling member at the other end of said other tubing element in alignment with said body member face, and fluid pressure means adapted to act against said first and second coupling members for simultaneously shifting the same jointly laterally whereby the first coupling member moves from said fluid passage and into coupling engagement with said third coupling member and said second coupling member moves into fluid communication with said fluid passage.

4. Apparatus for coupling flexible tubing elements having end coupling members attachable by relative lateral movement, said apparatus comprising a body member having a fluid passage emerging at a face thereof, lateral slide guide means for receiving a tubing end coupling member of a flexible tubing element therein and holding the same against said face in fluid communication with said fluid passage, said slide guide means extending laterally at one side of said body member for holding a second like end coupling member of another flexible tubing element at one side of said first end coupling member in lateral alignment therewith, means at the other side of said housing member for holding the other end coupling member of said other tubing element in lateral alignment with said body member face, and means for simultaneously shifting the first end coupling member and said second like end coupling member jointly laterally along said slide guide means whereby the first end coupling member moves from said fluid passage and into coupling engagement with said other end coupling member of said other tubing element and said second like end coupling member moves into fluid communication with said fluid passage.

5. Apparatus for coupling flexible tubing elements having end coupling members attachable by relative lateral movement, said apparatus comprising a body member having a fluid passage emerging at a face thereof, lateral slide guide means for receiving a tubing end coupling member of a flexible tubing element therein and holding the same against said face in fluid communication with said fluid passage, said slide guide means extending laterally at one side of said body member for holding a second like end coupling member of another flexible tubing element at one side of said first end coupling member in lateral alignment therewith, means at the other side of said housing member for holding the other end coupling member of said other tubing element in lateral alignment with said body member face, and power means adapted to bear against said second like end coupling member and operable for simultaneously shifting the same and said first end coupling member jointly laterally along said slide guide means whereby the first end coupling member moves from said fluid passage and into coupling engagement with said other end coupling member of said other tubing element and said second like end coupling member moves into fluid communication with said fluid passage.

6. Apparatus for adding a length of flexible tubing to a line while the latter is in use, said apparatus comprising a housing, a fluid conduit having a relatively fixed connection with said housing, means for holding an end coupling element of a flexible conduit in fluid communication with said fixed fluid conduit connection, means at opposite sides of said fixed fluid conduit connection for holding the opposite end coupling elements of a length of tubing to be inserted, the coupling at one side being in lateral alignment with thefi rst mentioned end coupling element and the coupling at the other side being in lateral alignment with the fluid conduit, and means for shifting the first mentioned end coupling element and the coupling at said one side of the fixed fluid conduit laterally in unison to bring the former into fluid communication with the coupling at said other side of the fixed fluid conduit and the latter into fluid communication with said fixed fluid conduit.

7. Apparatus for adding a length of flexible tubing to a line while the latter is in use, said apparatus comprising a housing, a fluid conduit having a relatively fixed connection with said housing, means for holding an end coupling element of a flexible conduit in fluid communication with said fixed fluid conduit connection, means at opposite sides of said fixed fluid conduit connection for holding the opposite end coupling elements of a length of tubing to be inserted, the coupling at one side being in lateral alignment with the first mentioned end coupling element and the coupling at the other side being in lateral alignment with the fluid conduit, and power means having a laterally moving part for simultaneously shifting the first mentioned end coupling element and the coupling at said one side of the fixed fluid conduit laterally in unison to bring the former into fluid communication with the coupling at said other side of the fixed fluid conduit and the latter into fluid comunication with said fixed fluid conduit.

8. Apparatus for adding a length of flexible tubing to a line while the latter is in use, said apparatus comprising a support, a fluid conduit having a discharge portion at said support, means for holding a coupling of a flexible conduit in fluid communication with said discharge portion, said support having means at opposite sides of said discharge portion for holding the opposite couplings of a length of tubing to be inserted, the coupling at one side being in lateral alignment with the first mentioned coupling and the coupling at the other side being in lateral alignment with said discharge portion, and means for shifting the first mentioned coupling and the coupling at said one side of said discharge portion laterally in unison to bring the former into fluid communication with the coupling at said other side of said discharge portion and the latter into fluid comunication with said discharge portion.

9. Apparatus for adding a length of flexible tubing to a line while the latter is in use, said apparatus comprising a support, a fluid conduit having a discharge portion at said support, means for holding a coupling of a flexible conduit in fluid communication with said discharge portion, said support having means at opposite sides of said discharge portion for holding the opposite couplings of a length of tubing to be inserted, the coupling at one side being in lateral alignment with the first mentioned coupling and the coupling at the other side being in lateral alignment with said discharge portion, said first mentioned coupling and the coupling at said one side of said discharge portion being jointly shiftable in a lateral direction to bring the former into fluid communication with the coupling at said other side of said discharge portion and the latter into fluid communication with said discharge portion.

No references cited.